United States Patent [19]

Wetzel

[11] Patent Number: 4,765,810
[45] Date of Patent: Aug. 23, 1988

[54] TESTABLE GASKET SEAL ARRANGEMENT
[75] Inventor: Lawrence E. Wetzel, Manlius, N.Y.
[73] Assignee: Clean Room Technology, Syracuse, N.Y.
[21] Appl. No.: 59,505
[22] Filed: Jun. 8, 1987
[51] Int. Cl.[4] .................................. B01D 53/30
[52] U.S. Cl. ............................. 55/270; 55/355; 55/500; 55/502; 73/40; 73/46
[58] Field of Search .............. 55/270, 355, 385 A, 55/500, 502; 73/40, 46

[56] References Cited

U.S. PATENT DOCUMENTS

| | | |
|---|---|---|
| 333,412 | 12/1885 | Hoeveler . |
| 2,536,793 | 1/1951 | Anderson et al. . |
| 2,766,614 | 10/1953 | Cook . |
| 3,834,134 | 9/1974 | McAllister . |
| 4,019,371 | 4/1977 | Chaplin et al. ............ 73/46 |
| 4,202,201 | 5/1980 | Johnson ..................... 73/40 |
| 4,324,568 | 4/1982 | Wilcox et al. . |
| 4,344,784 | 8/1982 | Deckas et al. . |
| 4,349,363 | 9/1982 | Patel et al. . |
| 4,373,635 | 2/1983 | Mules . |

Primary Examiner—Charles Hart
Attorney, Agent, or Firm—Wall and Roehrig

[57] ABSTRACT

A selective fluid flow control device has a control element which is held in sealing relationship with a housing, with first and second seals being formed to confine the fluid flow through the control element. The first and second seals define a sealed chamber from which the fluid is excluded, and a gas conduit communicates between outside of the housing and the sealed chamber for applying a test pressure to the chamber to test the quality of these seals. In a preferred embodiment, the selective fluid control device is a filter arrangement for a clean room or the like, and the seals are formed against the filter gasket by a seating arrangement formed of an extruded rail that has a web and first and second ribs, the ribs being biased against the gasket.

13 Claims, 3 Drawing Sheets

4,765,810

TESTABLE GASKET SEAL ARRANGEMENT

BACKGROUND OF THE INVENTION

This invention relates to fluid selective control devices, and more particularly to arrangements for testing seals which isolate a controlled fluid from its environment. The invention is more specifically directed to devices in which a seal between two mating surfaces can be externally tested. Favorably, the invention concerns the seal formed between a filter and the supporting framework therefor, which is intended to prevent air from leaking through or bypassing the filter. In a specific environment, the invention is directed to an arrangement for testing the seal for a type of filter which removes particulates and other contaminants from the air flow into or through a clean room device, such as a clean room or a laminar flow bench. In this specification, the term "clean room device" shall mean, inclusively, a clean room, a cabinet, a laminar flow bench, or any similar instrument or device.

In the conventional sealing arrangement for High Efficiency Particulate Air (HEPA) filters or other clean room filters, a gasket is disposed between the filter frame and its associated seat or holder, forming a single annular seal. Generally, testing for leaking or bypassing involves an elaborate procedure, a typical example of which is described in U.S. Pat. No. 4,324,568. A disbursed particulate, such as DOP or the like, is injected into the air flow to determine if any particles are leaking around the filter material. This procedure requires a considerable investment in equipment, and is capable of detecting leaks only in the downflow direction and cannot test the integrity of the seal in the upflow direction.

OBJECTS IN SUMMARY OF THE INVENTION

Accordingly, it is an object of this invention to provide a simple and straightforward system forming a testable seal, and which avoids the drawbacks of the prior art.

It is another object of this invention to provide a testable seal on which a positive check on the seal integrity can be effected between a gasket member and a seat therefor.

Yet another object of this invention to provide means for testing a seal formed around a void or chamber that is formed between two portions of a twin annular seal.

In accordance with an aspect of this invention, a selective fluid control device has a control element through which a fluid passes, the control element being held in a sealing relationship with a housing. First and second sealing means isolate the fluid flow through the control element, with a portion of the housing defining a sealed chamber between the first and second sealing means from which the fluid is to be excluded. A gas conduit communicates from outside the housing into the sealed chamber for applying a test pressure to the chamber. This permits testing of the quality of the seals formed by the first and second sealing means with respect to the control element. That is, by injecting a gas under pressure, it is possible simply to monitor the decay of pressure, and thereby ascertain whether there are any significant leaks, which would indicate a possible bypass.

In a clean room environment or any similar clean room device, the control element can be a filter for removing particulates or other impurities from the air-flow into the clean room or laminar flow bench. A gasket is formed at the periphery of one surface of the filter, and defines an inlet area surrounded by the gasket. The filter is mounted in a frame or mounting arrangement which includes a seat for mating with the gasket to form a substantially gas-tight seal. According to this invention, this seat can include a rail which has first and second ribs that extend around the periphery of the filter to form a sealing relation with the gasket and to create a sealed chamber between the ribs. A gas conduit extends through one of the ribs into the sealed chamber to apply a test pressure into it to test the quality of the seals formed by the ribs against the gasket. In other embodiments, the control element can be a valve, for example, a ball valve or double wedge gate valve, in which the integrity of inlet and outlet seals can be tested.

The above and many other objects, features, and advantages of this invention will become more fully understood from the ensuing description of preferred embodiments, which should be considered in connection with the accompanying drawing.

DETAILED DESCRIPTION OF THE PREFERRED EMBODIMENTS

Figure 1:
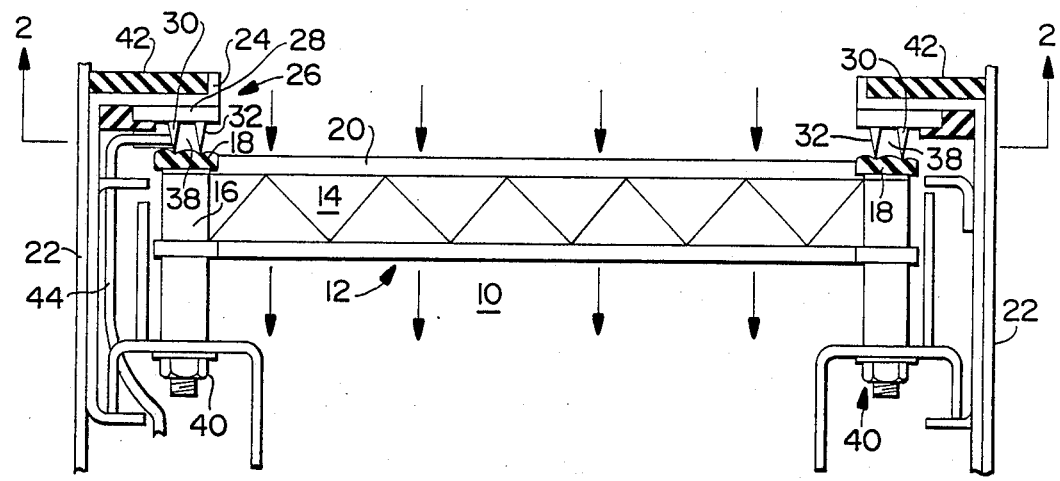
FIG. 1 is a sectional elevation of a sealing arrangement for a clean room air filter, employing the principles of this invention according to one embodiment.

The invention herein is concerned generally with devices in which a pair of continuous ring seals form a sealed space between them that permits a test pressure condition (i.e. overpressure or vacuum) to be applied to test the quality of the seals. The following specific examples are offered to explain and embody this concept.

With reference to the Drawing, and initially to FIGS. 1 and 2 thereof, a filter arrangement 10, e.g., for a clean room device or for supplying filtered air to a work bench, is schematically shown to comprise a filter 12 for removing particulates and other contaminants from a flow of air, represented with arrows, from an air plenum above the filter 12 into the clean room which is disposed below the filter 12. The filter 12 is comprised of high efficiency particulate air (HEPA) filter material 14 that is bonded within a frame 16. The latter has a flat gasket 18, such as a rubber ring, extending around the periphery of its upper surface. The gasket 18 defines a filter inlet area 20 therewithin.

A filter housing assembly 22 of this arrangement 10 includes a shelf 24 which surrounds the upper surface of the filter 12 and mounts a double-rib seat 26. The latter is favorably formed as a rail 26 of extruded aluminum or other suitable rigid material, such as plastic resin, steel, or hardwood. The rail 26 has an upper web 28 and depending outer rib 30 and inner rib 32. In this embodiment, the rail has a cross section of the greek letter pi. As shown in FIG. 2, the rail 26 in this example is mitered and welded at corners 34 thereof, which are sealed with caulk 36 or the like. This provides a continuous annular sealing member. A sealed chamber 38 is formed by the gasket 18 between the outer and inner ribs 30, 32, when the filter is held by holding structure 40 against the rail 26. The holding structure can be a clamping device of conventional design.

The filter housing assembly also comprises rubber sealing glands 42 which seal the shelf 24 to the filter housing 22, and also seal the rail 26 with respect to the shelf 24.

Figure 2:
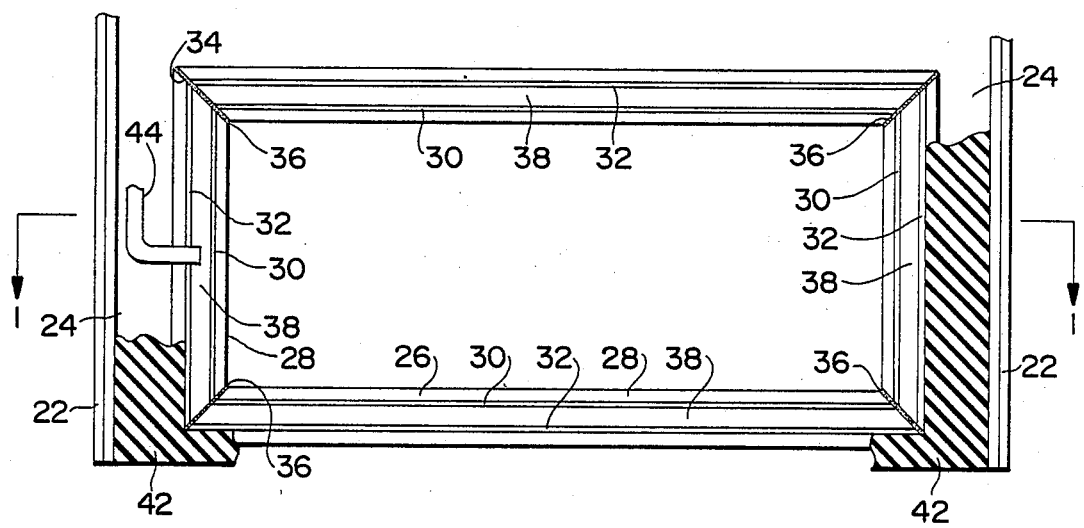
FIG. 2 is a plan view taken along lines 2—2 of FIG. 1.

As further shown in FIGS. 1 and 2, a test gas tube 44 or pipe extends from outside the chamber 38 and through the outer rib 30 into the chamber. This test gas tube 44 permits gas to be injected under pressure to test the integrity of the seal formed between the gasket 18 and each of the ribs 30 and 32. The decay of the test pressure in the chamber 38 can be simply observed, and if the seals do not hold pressure, then one or the other of the two seals is insufficient and steps can be taken to reseat the gasket 18 against the rail 26.

Figure 3:
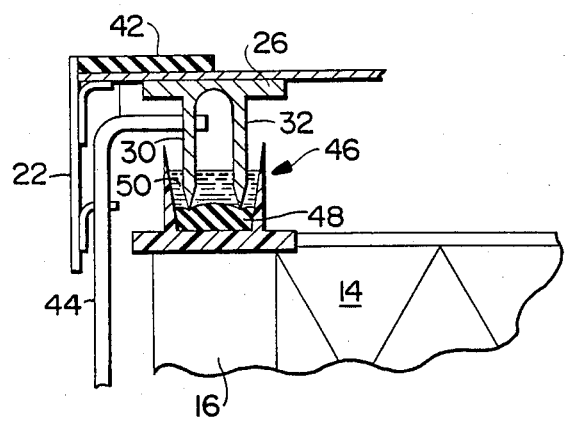
FIG. 3 is a partial sectional elevation illustrating an alternative arrangement of the invention.

An alternative arrangement of this invention is shown in FIG. 3. Those elements which are identical with the corresponding structure of FIG. 1 are identified with the same reference numbers, and a detailed description thereof is omitted.

The structure shown in FIG. 3 is basically the same as that of FIGS. 1 and 2, except that in place of the flat gasket 18, a tray or trough 46 is employed. At the bottom of the trough 46 a layer of rubber or similar resilient gasket material 48 is situated, and a fluid or gel sealant 50 fills the tray 46 above the rubber material 48. Here the ribs 30 and 32 of the rail 26 seat against the resilient material 48, and the liquid or gel sealant 50 improves the seal by surrounding both sides of the ribs 30, 32. The fluid or gel material 50 can be either of the type that remains fluid, or the type that sets into a more or less solid form with the application of heat or a chemical hardener. Here, as with the first embodiment, the test gas tube 44 permits a gas test pressure to be applied into the chamber 38 between the ribs 30 and 32.

In another alternative (not shown), the ribs could be formed on the filter frame 16, with the gasket on the filter holder. In that case, the test gas tube could penetrate the gasket in the position between the contact lines of the two ribs.

Figure 3A:
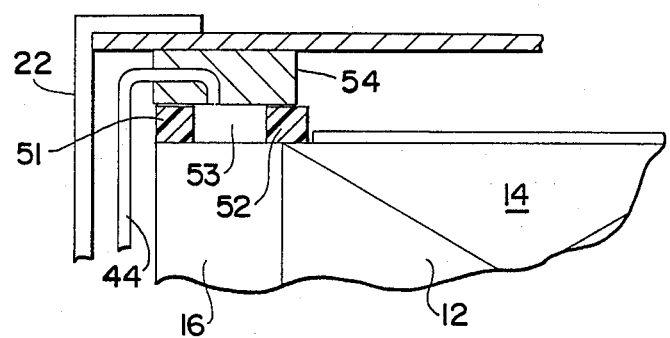
FIGS. 3A and 3B illustrate other alternative versions of the invention.
Figure 3B:
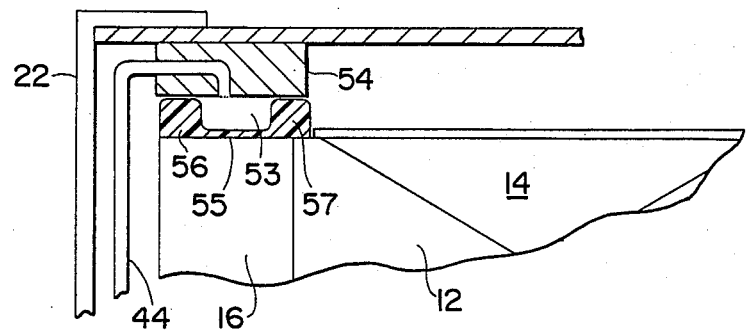

As shown schematically in FIG. 3A, a pair of resilient sealing gaskets 51 and 52 are disposed on the filter 12, with one inside the other to define a test space between them. These seal against a generally flat seat member 54 of the filter housing assembly 22 with the tes conduit 44 penetrating the seat member 54 into the chamber 53. The arrangement of FIG. 3B is similar, but employs a unitary ring gasket 55 that has a plurality of annular ribs 56 and 57 thereon which define the test space 53 between them.

Figure 4:
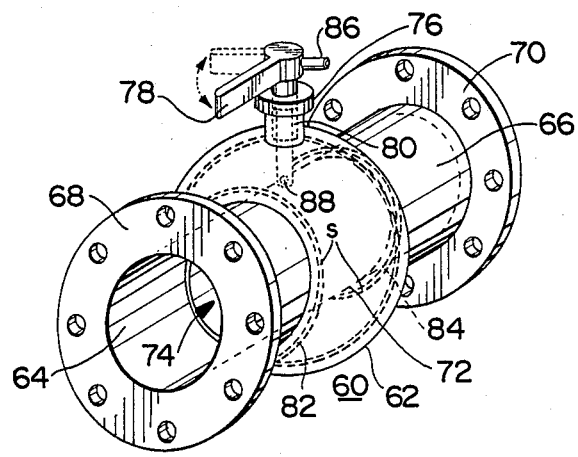
FIGS. 4 and 5 are schematic perspective views of a ball valve and a double wedge gate valve respectively, each arranged according to this invention.

As shown in FIG. 4, the invention can be embodied in a ball-type valve, such as the ball valve assembly 60. In the latter, a housing 62 has inlet and outlet ports 64 and 66 with respective flanges 68 and 70. A rotary ball 72 contained in the housing 62 has a through passage 74 perpendicular to its axis of rotation. The ball 72 turns to align the passage 74 with the ports 64 and 66 to open the valve. A hollow tubular stem 76 connected with the ball 72 rotates the latter through ninety degrees to open and closed positions. Here, the stem 76 is generally hollow or tubular. A handle 78 is fitted on the stem 76 outside the housing, and a packing 80 or sealing gland seals the stem 76 with respect to the housing 62.

Inlet and outlet O-ring seals 82 and 84 are provided in the housing surrounding the inlet and outlet ports 64, 66, respectively, and these press against the surface of the ball 72 to create a seal.

A nipple 86 connects to the space in the hollow stem 76, and is provided for admitting a test pressure to the interior of the housing 62, through the hollow stem 76 and through an opening 88 in the stem 76 within the housing 62. The seals effected by the O-rings 82 and 84 can be tested when the ball 72 is in either its open or closed position.

Figure 5:
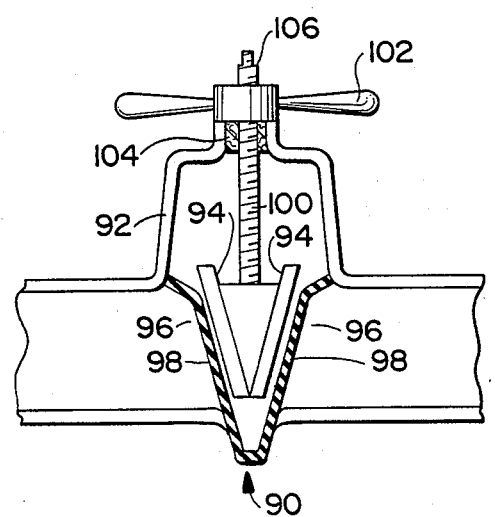

As shown in FIG. 5, a double-wedge gate valve assembly 90 can be formed of a housing 92 and a pair of wedges 94 which move into or out of engagement with respective seats 96 with which sealing rings 98 are associated. A hollow stem 100 raises or lowers the wedges 94 as a handle 102 is rotated. A packing or sealing gland 104 seals the stem 100 with respect to the housing 92. A nipple 106 admits a test pressure through the hollow stem 100 into the interior of the housing 92 to test the quality of the seals formed by the wedges 94 with respect to their valve seats 96.

While the invention has been described in detail with respect to certain preferred embodiments, it should be recognized that the invention is not limited to those embodiments. Rather, many variations and modifications of these would be apparent to those of skill in the art, without departing from the scope and spirit of the invention, as defined in the appended claims.

What is claimed is:

1. A selective fluid control device in which a control element, through which a fluid passes, is held in a sealing relationship with a housing therefor, with first and second sealing means for isolating the fluid flow through the control element and with a portion of the housing defining a sealed chamber from which said fluid is to be excluded; wherein said device further comprises a gas conduit communicating between outside said housing and said sealed chamber for applying a test pressure condition to said chamber to test the quality of te seals formed by said first and second sealing means with respect to said acontrol element; and in which said control element is a filter for removing particulates or other impurities from the fluid, and said first and second sealing means include a rail having first and second sealing ribs and a sealing gasket, with one of said rail and said gasket being formed on said filter and the other thereof being formed on said housing, the ribs mating with said gasket to form an annular space as said chamber.

2. A ball valve having as a control element a rotatable ball with a through passage extending perpendicular to its axis of rotation, and a housing defining a sealed chamber for the rotatable b all including an entrance port, an exit port, first and second sealing means for isolating fluid flow through the rotatable ball in a fully open position and sealing against said ball in a fully closed position, means surrounding said entrance and exit ports for holding said first and second sealing means against said ball to define a sealed chamber within said housing when said ball is in its fully open and its fully closed positions; and a gas conduit communicating between outside said housing and said sealed chamber for applying a test pressure condition to said chamber to test the quality of the seals formed by said first and second sealing means with respect to said rotatably ball in either the fully open or fully closed positions thereof.

3. A ball valve according to claim 2 in which said valve includes a hollow rotatable valve stem affixed on said ball and extending through said housing, and having means thereon to effect rotation of said ball, and said gas conduit includes means for injecting gas through said hollow stem into the sealed chamber formed by said ball, said housing, and said first and second sealing means.

4. A double-wedge gate valve comprising a housing and, as a control element, a pair of wedges which are selectively raised and lowered in said housing with respect to a pair of valve seats, said housing haing an inlet port and an outlet port, first and second sealing means for isolating fluid flow into said housing when said wedges are lowered into engagement with said valve seats, said sealing means being disposed to seal said wedges against their respective valve seats; means extending through said housing for selectively raising and lowering said wedges; third sealing means for sealing said raising and lowering means against said housing; and a gas conduit communicating between outside said housing and inside thereof for applying a test pressure condition within said housing to test the quality of the seals formed by said first, second, and third sealing means.

5. In a filter arrangement for a clean room or the like in which a filter removes particulates or other impurities from a fluid, a gasket arrangement is disposed in contact with said filter to define an inlet area surrounded by the gasket arrangement, and a filter mounting arrangement mounts said filter and has an annular seat which mates against said gasket arrangement to form a substantially fluid-tight seal with the gasket arrangement biased between said filter and said seat; the improvement wherein said gasket arrangement and said seat together comprise means forming inner and outer annular seals around the periphery of said filter inlet area to form a sealed test chamber between the inner and outer annular seals, and a gas conduit communicates. With said sealed test chamber for applying a test pressure condition to said chamber to test the quality of the seals formed by said filter, said gasket arrangement, and said seat.

6. A filter arrangement according to claim 5 in which said seat includes first and second ribs which extend around the periphery of the filter inlet area to form a sealing condition with said gasket arrangement.

7. A filter arrangement according to claim 6 in which said seat includes an extruded rail having a web and said first and second ribs are formed integrally therewith.

8. A filter arrangement according to claim 7 in which said extruded rail has a pi-shaped cross section.

9. A filter arrangement according to claim 7 in which said gas conduit includes a pipe that extends through one of said ribs into said sealed chamber.

10. A filter arrangement according to claim 7, in which said gasket includes a tray containing a fluid sealant into which the first and second ribs penetrate.

11. A filter arrangement according to claim 10 in which said gasket includes a resilient gasket member in said tray beneath said fluid sealant and against which said first and second ribs repose.

12. A filter arrangement according to claim 5 in which said gasket arrangement includes inner and outer annular gaskets which define the sealed test chamber therebetween.

13. A filter arrangement according to claim 5 in which said gasket arrangement includes an annular gasket member having inner and outer annular ribs which define the sealed test chamber therebetweeh.

* * * * *

UNITED STATES PATENT AND TRADEMARK OFFICE
CERTIFICATE OF CORRECTION

PATENT NO. : 4,765,810
DATED : August 23, 1988
INVENTOR(S) : Lawrence E. Wetzel

It is certified that error appears in the above-identified patent and that said Letters Patent is hereby corrected as shown below:

Claim 1, line 43, "te" should read --the--.

line 44, "acontrol" should read --control--.

Claim 2, line 56, "rotatable b all" should read --rotatable ball--.

Claim 4, line 14, "haing" should read --having--.

Claim 13, line 36, "therebetweeh" should read ----therebetween--.

Signed and Sealed this

Twenty-eighth Day of February, 1989

Attest:

DONALD J. QUIGG

*Attesting Officer*   *Commissioner of Patents and Trademarks*